(12) United States Patent
Batholomaeus et al.

(10) Patent No.: US 9,917,631 B2
(45) Date of Patent: Mar. 13, 2018

(54) DIVERSITY MONITORING ANTENNA SYSTEM

(71) Applicant: RF Industries Pty Ltd, Seven Hills (AU)

(72) Inventors: Anthony David Batholomaeus, Allenby Gardens (AU); Scott Hayden Alford, Bayswater (AU)

(73) Assignee: RF INDUSTRIES PTY LTD, Seven Hills (AU)

( * ) Notice: Subject to any disclaimer, the term of this patent is extended or adjusted under 35 U.S.C. 154(b) by 0 days.

(21) Appl. No.: 15/334,133

(22) Filed: Oct. 25, 2016

(65) Prior Publication Data

US 2017/0272142 A1    Sep. 21, 2017

(30) Foreign Application Priority Data

Mar. 17, 2016 (AU) .............................. 2016901003

(51) Int. Cl.

| H04B 1/06 | (2006.01) |
|---|---|
| H04B 7/08 | (2006.01) |
| H04B 17/13 | (2015.01) |
| H04B 17/18 | (2015.01) |
| H04B 17/20 | (2015.01) |
| H04B 17/21 | (2015.01) |
| H04B 17/23 | (2015.01) |
| H04B 17/318 | (2015.01) |

(52) U.S. Cl.
CPC ........... *H04B 7/0814* (2013.01); *H04B 17/13* (2015.01); *H04B 17/18* (2015.01); *H04B 17/20* (2015.01); *H04B 17/21* (2015.01); *H04B 17/23* (2015.01); *H04B 17/318* (2015.01)

(58) Field of Classification Search
CPC .... H04B 10/032; H04B 10/25; H04B 10/808; H04B 1/006; H04B 1/40; H04B 2203/5408; H04B 2203/5454; H04B 2203/5458; H04B 2203/5483; H04B 3/44; H04B 3/54; H04B 3/56; H04B 7/2621; H04B 17/13; H04B 17/18; H04B 17/20; H04B 17/21
USPC ...................................................... 455/277.1
See application file for complete search history.

(56) References Cited

U.S. PATENT DOCUMENTS

| 6,178,310 B1 * | 1/2001 | Jeong ................. H04B 17/0085 455/121 |
| 2008/0219246 A1 * | 9/2008 | Siddiqui ................... H01P 1/10 370/357 |

* cited by examiner

*Primary Examiner* — Ajibola Akinyemi
(74) *Attorney, Agent, or Firm* — Faegre Baker Daniels LLP (57) ABSTRACT

Switching apparatus for use in RF transmission systems. The apparatus comprises first and second RF signal inputs, each coupled to an RF signal path including a coupler directing a portion of input RF signal power to corresponding first and second RF signal outputs. The apparatus includes an RF signal switching arrangement having a control input, a switch output, a first switch input coupled to the first RF signal path, a second switch input coupled to the second RF signal path, and the RF signal switching arrangement is operable by the control input to selectively connect the first or second switch input to the switch output. An RF signal monitoring output is coupled to the switch output, and a processor is configured to receive a switch command input and generate a switch control signal which is adapted to configure the RF signal switch arrangement in accordance with the switch command input.

16 Claims, 3 Drawing Sheets

DIVERSITY MONITORING ANTENNA SYSTEM

FIELD OF THE INVENTION

The present invention relates to monitoring the performance and operation of radio frequency (RF) transmission systems.

BACKGROUND OF THE INVENTION

Radio frequency (RF) transmission is used in a wide range of communications applications. In many RF communications systems, fixed transmitters and/or receivers are deployed, which may serve large numbers of users and operate at relatively high power levels. In most applications, high availability of the transmission system is essential or, at the very least, is expected by users. Accordingly, for commercial, technical and safety reasons it is desirable to incorporate appropriate monitoring devices within these systems, to enable changes in performance and/or failures of equipment to be identified and rectified quickly and safely.

U.S. Pat. No. 8,983,415, issued on 17 Mar. 2015, discloses a monitoring apparatus that is able to monitor individual frequency channels in an RF signal band. The apparatus comprises an electronic processor which is configurable to operate a tunable filter to select desired channel sub-bands, and to measure characteristics of channels, such as power levels. The measurements are used to provide monitoring signals, including indications and/or alarms if any measured quantities, associated with any one or more channels, fall outside acceptable operating ranges.

The abovementioned apparatus is thus able to monitor individual signals and/or sub-bands, and can be employed to reduce the number of monitoring devices required at sites operating over multiple frequency bands.

It is an object of the present invention to provide for a further reduction in the number of monitoring devices required to be deployed within RF communications systems.

SUMMARY OF THE INVENTION

In one aspect, the invention provides a switching apparatus comprising:
at least first and second RF signal inputs, each coupled to an RF signal path including a coupler directing a portion of input RF signal power to corresponding first and second RF signal outputs;
an RF signal switching arrangement having a first switching control input, a switch output, a first switch input coupled to the first RF signal path, a second switch input coupled to the second RF signal path, the RF signal switching arrangement being operable by the control input to selectively connect the first or second switch input to the switch output;
an RF signal monitoring output coupled to the switch output; and
a processor having a first switch control output coupled to the control input of the RF signal switching arrangement, and configured to:
receive a switch command input; and
generate a switch control signal at the first switching control output, which is adapted to configure the RF signal switch arrangement in accordance with the switch command input.

Advantageously, embodiments of the invention provide a mechanism to switch between at least two RF inputs, and direct a selected RF signal to a monitoring output, from which it may be connected to a suitable RF signal monitoring device, such as is disclosed in U.S. Pat. No. 8,983,415. The monitoring device may therefore be shared among multiple RF signal sources. Furthermore, the monitoring device may itself be configured in communication with the RF signal switching apparatus, such that it is able to issue input commands to the processor, thereby controlling selection of the signal to be monitored. At the same time, the RF signal switching apparatus passes the RF signal inputs through to corresponding RF signal outputs, in a substantially transparent manner. The switching apparatus may therefore be deployed in existing RF communications systems without requiring any other configuration changes.

According to embodiments of the invention, the RF signal switching apparatus is configured to support a plurality of frequency bands. In particular, frequency bands commonly used for RF communications may be supported, for example a 132 to 174 MHz band, a 380 to 520 MHz band, a 746 to 870 MHz band, and/or a 870 to 960 MHz band.

Embodiments of the invention may further comprise first and second RF power detectors respectively coupled to the first and second RF signal paths and having first and second detected power outputs, wherein the processor has at least one input operatively coupled to the first and second detected power output, and is further configured to monitor power levels at the first and second RF signal inputs.

Advantageously, providing power level monitoring within the RF signal switching apparatus enables rapid detection and indication of potential problems, such as excessive power levels, continuously across the RF signal inputs. In this respect, in embodiments of the invention the processor is further configured to maintain an alarm level setting, and to generate an alarm signal in the event that one or more of the monitored power levels exceeds the alarm level setting.

The processor may be further configured to receive an alarm level command input having an alarm level setting parameter, and to update the alarm level setting in accordance with the alarm level setting parameter.

Accordingly, a connected monitoring device, which may be selectively monitoring only one of the first and second RF signal inputs, and furthermore may be monitoring individual channels or sub-bands within those RF signals, is able to set an overall alarm power level, and receive an alarm signal generated by the RF signal switching apparatus in the event that the alarm level setting is exceeded on either one of the first and second RF signal inputs. Embodiments of the invention may also support an alarm delay setting, so that the generation of alarms in response to short spikes in power may be avoided, and/or a power warning level, which is less than the power alarm level, enabling early detection of increasing power levels.

In accordance with embodiments of the invention, the portion of input RF signal power is directed to the first and second RF signal outputs via first and second variable RF attenuation arrangements, each having at least one attenuation control signal, wherein the processor has at least one attenuation control output operatively coupled to the attenuation control inputs, and is further configured to generate attenuation control signals at the attenuation control output.

Accordingly, for example, the processor is able to control the power output level at the first and second RF signal outputs. More particularly, a combination of amplification and attenuation may be employed within embodiments of the invention to achieve unity gain between each RF signal input and its corresponding RF signal output, such that the RF signal switching apparatus is substantially 'transparent' to the communications system in which it is deployed.

In embodiments of the invention, the processor is further configured to maintain attenuation settings corresponding with each of the first and second RF signal outputs, and to generate respective first and second attenuation control signals at the attenuation control output in accordance with the attenuation settings.

The attenuation settings may comprise calibration data, and generating any one of the attenuation control signals may comprise converting an absolute attenuation value to a control signal value using the calibration data.

In embodiments of the invention, the calibration data comprises separate calibration data for each one of a plurality of frequency bands supported by the RF signal switching apparatus. As will be appreciated by persons skilled in the art of RF engineering, components such as amplifiers, directional couplers, and other active and passive circuit elements, may have non-flat frequency response, such that the attenuation settings required to achieve a desired gain between each RF signal input and its corresponding RF signal output is different within different frequency bands.

In embodiments of the invention, the attenuation settings are configured such that, in use, a net gain between each of the first and second RF signal inputs and the corresponding first and second RF signal outputs is substantially zero dB.

In some embodiments, the RF signal monitoring output is coupled to the switch output via a monitoring variable RF attenuation arrangement having a monitoring attenuation control input, wherein the processor has an attenuation control output operatively coupled to the monitoring attenuation control input, and is further configured to generate attenuation control signals at the attenuation control output. This advantageously enables the power level at the RF signal monitoring output to be controlled, for example in accordance with control signals or commands received from a connected monitoring device. A combination of amplifiers and attenuators, including the monitoring variable RF attenuation arrangement, may be configured such that there is a net gain between the RF signal inputs and the monitoring output, to facilitate monitoring by an attached monitoring device.

The processor may be further configured to maintain attenuation settings corresponding with the RF signal monitoring output, and to generate monitoring attenuation control output signals in accordance with the attenuation settings.

The processor may further be configured to receive a gain setting command input having a gain setting parameter, and to update at least one of the monitoring attenuation settings in accordance with the gain setting parameter.

The monitoring attenuation settings may comprise calibration data, and generating the monitoring attenuation control signal may comprise converting an absolute gain setting value to a control signal value using the calibration data. The calibration data may comprise separate calibration data for each one of the first and second RF signal inputs, and for each one of a plurality of frequency bands supported by the RF signal switching apparatus.

In some embodiments, the RF signal switching apparatus comprises a third RF signal input, wherein the RF switching arrangement comprises a third switch input coupled to the third RF signal input, and is operable to selectively connect any of the first, second or third switch inputs to the switch output.

Embodiments of the invention may comprise a third RF power detector coupled to the third RF signal input, and having a third detected power output, wherein the processor has an input operatively coupled to the third detected power output, and is further configured to monitor a power level at the third RF signal input.

Further aspects, features and benefits of the invention will be apparent from the following description of particular embodiments, which are provided by way of example in order to teach and illustrate the principles of the invention, but should not be regarded as limiting of the scope of the invention as set out in any of the preceding statements, or as defined in the claims appended hereto.

BRIEF DESCRIPTION OF THE DRAWINGS

Embodiments of the invention will now be described with reference to the accompanying drawings, in which like reference numerals refer to like features, and wherein.

DETAILED DESCRIPTION OF EMBODIMENTS

Figure 1:
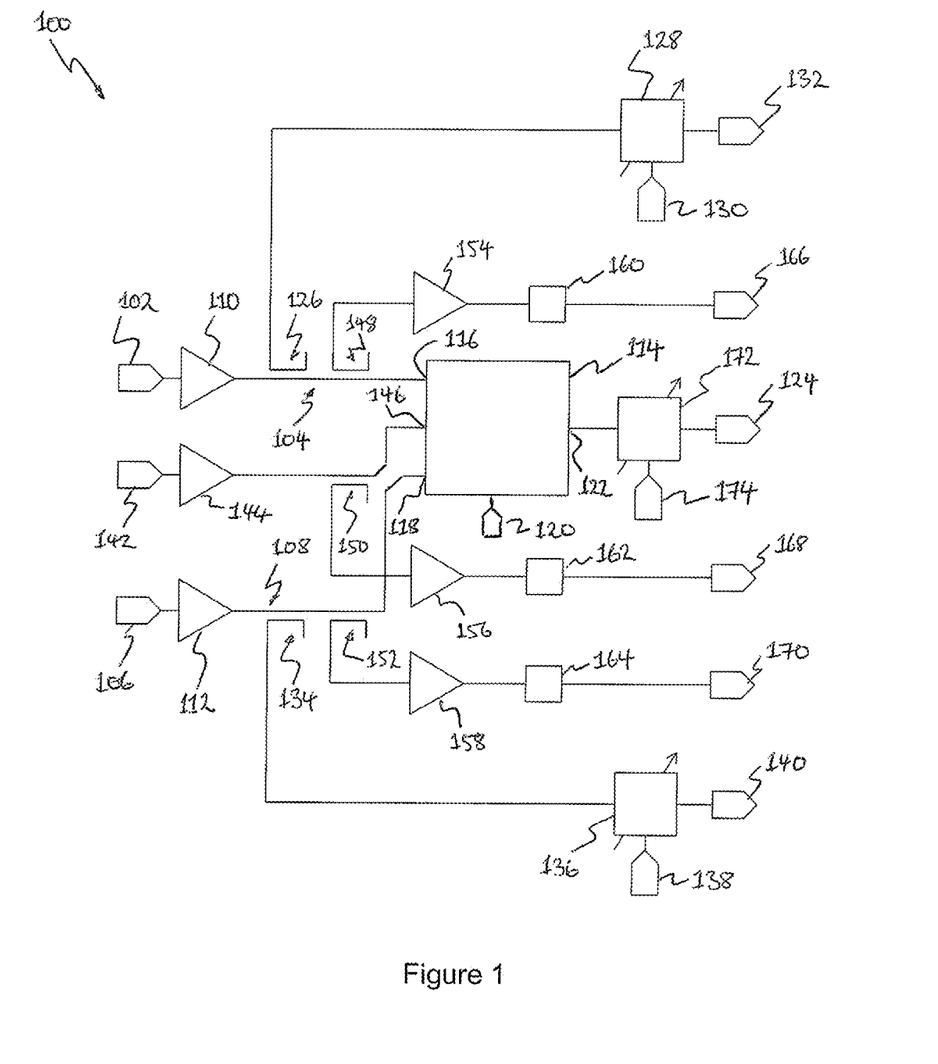
FIG. 1 is a block diagram of a switching apparatus embodying the invention.

FIG. 1 shows a block diagram of a switching apparatus 100 embodying the invention. The switching apparatus 100 has a first RF signal input 102 coupled to a first RF signal path 104, and a second RF signal input 106 coupled to a second RF signal path 108. Disposed at the input end of each signal path 104, 108 is a corresponding preamplifier 110, 112, which serves to compensate for losses arising in other components of the switching apparatus 100.

The switching apparatus 100 further comprises an RF signal switching arrangement 114, further details of which are discussed below with reference to FIG. 2. The RF signal switching arrangement 114 has a first switch input 116 coupled to the first RF signal path 104, and a second switch input 118 coupled to the second RF signal path 108. The switching arrangement 114 also has a switch control input 120, which is coupled to a microprocessor control unit such as will be described below with reference to FIG. 4.

The switching arrangement 114 has a switch output 122 which is coupled to an RF signal monitoring output 124.

A directional coupler 126 disposed in the first RF signal path 104 couples a portion of power from the output of amplifier 110, via a precision variable attenuator unit 128 having a control input 130, to a corresponding first RF signal output 132. In normal operation, the precision variable attenuator unit 128 is configured, via the control input 130, to achieve unity net gain between the first RF signal input 102 and the first RF signal output 132, i.e. such that this path through the switching apparatus 100 is substantially 'transparent'. In a practical implementation, the directional coupler 126 may be a 9-dB coupler, such as, for example, part number TCD-9-1WX+ available from Mini-Circuits of Brooklyn, N.Y.

In like fashion, a further directional coupler 134 couples power from the output of amplifier 112 in the second RF signal path 108 via precision variable attenuator unit 136 having control input 138, to second RF signal output 140. Again, the precision variable attenuator unit 136 is configured, in use, so as to provide unity gain between the second RF input 106 and the second RF output 140.

In at least some embodiments, the switching apparatus 100 also comprises a third RF signal input 142. The third input 142 in the embodiment 100 does not provide the 'pass-through' functionality of the first and second RF signal inputs 102, 106. The third input 142 may be used, for example, to receive a signal from an antenna in order to provide additional local signal monitoring functions. RF signals received at input 142 are amplified in the amplifier 144, and directed to a third input 146 of the switching arrangement 114.

Further directional couplers 148, 150, 152 are disposed in the three RF signal input paths, and couple a proportion of the received power in each path via amplifiers 154, 156, 158 to RF power detectors 160, 162, 164. The power detectors 160, 162, 164 enable the received RF power at each of the inputs 102, 142, 106 to be monitored. In a practical implementation, suitable power detector components include part number LMV221, available from Texas Instruments Incorporated of Dallas, Tex. This part is a logarithmic power detector, which provides an output voltage proportional to the input RF power in dB. According to embodiments of the invention, the output voltages from the detectors 160, 162, 164 are monitored by a microprocessor control unit via outputs 166, 168, 170.

Finally, with regard to FIG. 1, a further variable attenuator 172, having a control input 174, is provided to enable the power level at the RF signal monitoring output 124 to be controlled. In a practical implementation, a suitable component for implementation of the variable attenuator 172 is, for example, RF digital step attenuator, part number PE4312, available from Peregrine Semiconductor of San Diego, Calif. Further details of the control of this device will be discussed below, with reference to FIG. 3.

Figure 2:
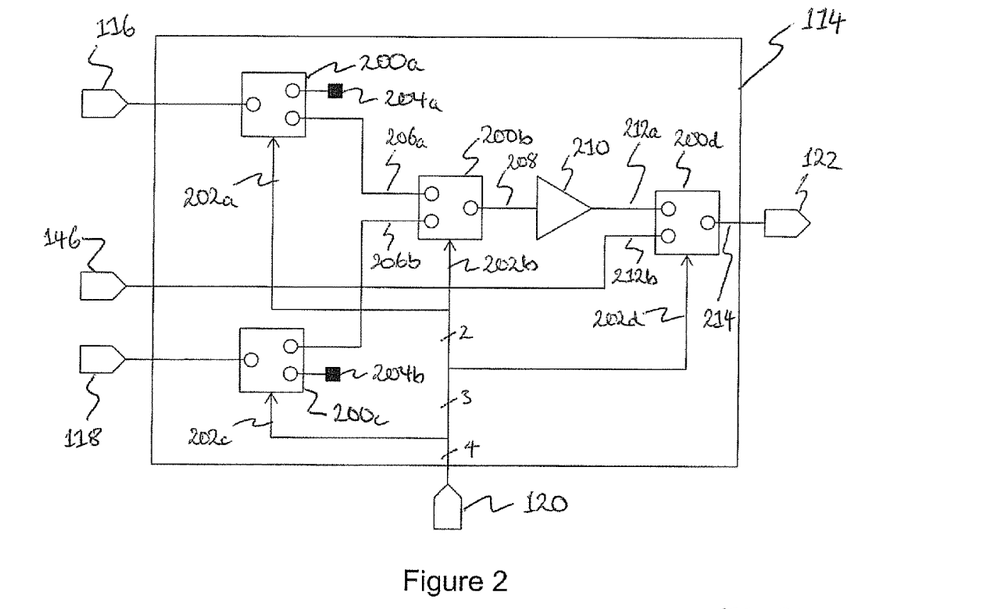
FIG. 2 is a block diagram of an RF signal switching arrangement suitable for use in the apparatus of FIG. 1.

Turning now to FIG. 2, there is shown a block diagram of an RF signal switching arrangement 114 embodying the invention. The RF signal switching arrangement 114 comprises four 1×2 RF switches 200a, 200b, 200c and 200d. In a practical implementation, a suitable component is, for example, SPDT RF switch, part number PE42422, available from Peregrine Semiconductor. Each switch has a corresponding control input 202a, 202b, 202c, 202d, which is a binary voltage signal configured to set the switch into a corresponding one of its two connected states.

The two switches 200a, 200c are configured such that a single input port, connected respectively to the first and second switch inputs 116, 118, can be connected either to a signal termination 204a, 204b, or to a continuing signal path 206a, 206b.

The continuing signal paths 206a, 206b are connected to the switch 200b, which is configured in a two-input-single-output arrangement. The control signal 202b selectively switches between the input paths 206a (potentially carrying the RF input signal received at switch input 116) and path 206b (potentially carrying the RF signal received at switch input 118). The signal output from the switch 200b is amplified by an amplifier 210, which serves to compensate for switching losses, and output to a port 212a of the further switch 200d.

The switch 200d is again configured in a two-input-one-output arrangement. The second input 212b of the switch 200d is received from the external switch input 146. The switch 200d is operated via control input 202d to select one of the two inputs 212a, 212b to be passed to the output 214. Accordingly, depending upon the control settings 202a, 202b, 202c, 202d, the signal connected to the external switch output 122 may be the signal received at any one of the three inputs 116, 118, 146.

Figure 3:
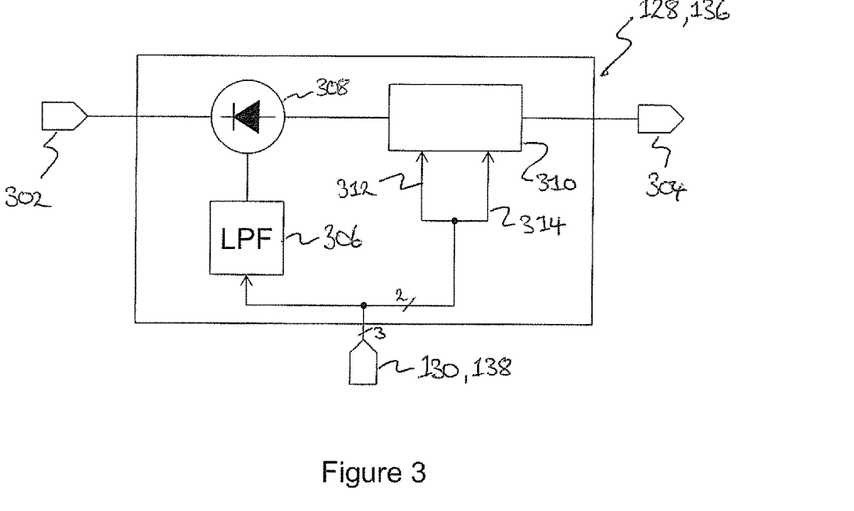
FIG. 3 is a block diagram of a precision variable attenuator unit embodying the invention.

Turning now to FIG. 3, there is shown a block diagram of the precision variable attenuator units 128, 136, according to an embodiment of the invention. Each attenuator unit has a corresponding input 302, and output 304. A control input, generated by the microprocessor control unit, comprises three signals. The first, a pulse-width-modulated (PWM) signal, is input to a low-pass filter 306 which thereby generates a corresponding voltage output used to control a PIN diode-based analog attenuator 308. In a particular embodiment, the PWM input provides 16 steps of voltage control, enabling fine adjustment of the total attenuation of the attenuator units 128, 136 in steps of 0.1 dB or less.

The further two signal input components comprise a digital serial data input 312, and a digital 'select' input 314, which are respectively connected to 'data' and 'latch-enable' inputs of an RF digital step attenuator 310, such as part number PE4312 from Peregrine Semiconductor. This component provides digital control over a 31.5 dB attenuation range, in 0.5 dB steps. The combination of attenuators 308, 310 enables the net gain of the path between input 102 and output 132, and of the path between input 106 and output 140, each to be set to substantially unity, i.e. to within 0.1 dB.

Figure 4:
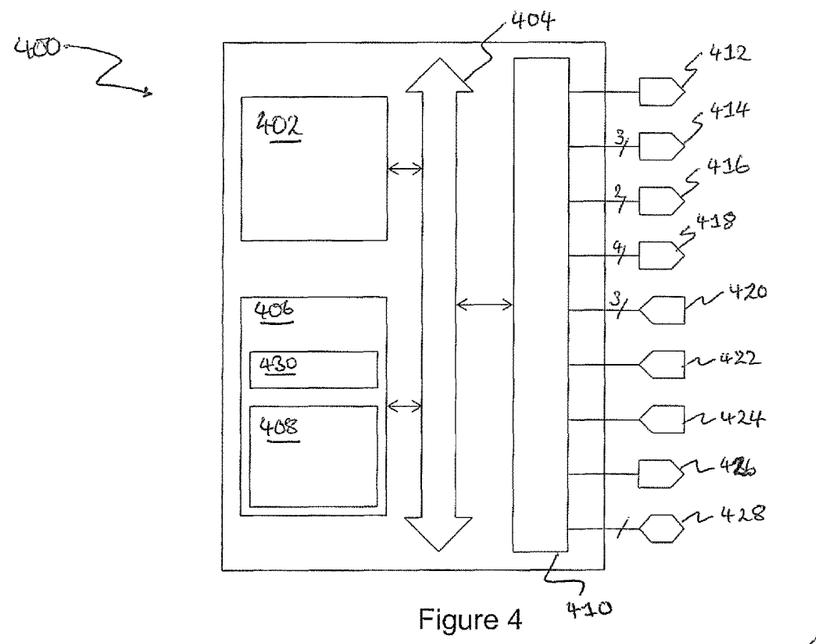
FIG. 4 is a block diagram illustrating a microprocessor control unit embodying the invention.

FIG. 4 shows a block diagram of a microprocessor control unit 400. The microprocessor control unit 400 comprises a central processing unit (CPU) 402 which is connected to a peripheral bus 404. A memory device 406 is accessible to the CPU 402 via the bus 404, the CPU 402 and memory 406 may be integrated into a single micro-controller device, such as a PIC18F67K22 eight-bit microcontroller, available from Microchip Technology Inc. of Chandler, Ariz., as is used in a particular embodiment of the invention. Alternatively, however, the CPU 402 and memory 406 may be separate components operatively coupled together via bus 404 on a printed circuit board, or otherwise in a conventional manner.

The memory 406 may comprise volatile memory locations, non-volatile memory locations, or more generally a combination of both, for storing both static and transient data and program instructions associated with the operation of the processor 402. In particular, the memory 406 at least includes a body of program instructions 408 executable by the CPU 402 in order to implement relevant features of the RF signal-switching apparatus 100 by appropriate signalling to the control inputs that have been described above with reference to FIGS. 1 to 3.

Accordingly, the control unit 400 further comprises a number of electronic control and data lines accessible via the bus 404 through one or more peripheral interfaces 410. The PIC micro-controller mentioned above, for example, includes a number of inbuilt peripheral modules, including a serial port module, analog-to-digital converter module, comparators, timers, pulse-width modulators, and various other I/O functions. For the purposes of the present description, these various modules are represented by a single peripheral interfaces block 410 in FIG. 4.

In order to control the digital step attenuators 172, 310 (in precision attenuator units 128, 136), the control unit 400 has a serial digital data output 412, and a group of three output digital select signals 414. Under control of the CPU 402, one of the three select signals 414 may be activated, and serial data generated at output 412 in order to program the desired attenuation value into the selected step attenuator.

Two PWM output signals 416 are generated under control of the CPU 402 corresponding with desired control voltages to be applied to the PIN attenuators 308 in the precision variable attenuator units 128, 136.

A group of four digital outputs 418 can be generated under control of the CPU 402 in order to drive the switching states of the four 1×2 switches 200a, 200b, 200c and 200d.

A set of three voltage inputs 420 are received from the three detectors 160, 162, 164. Under control of the CPU 402 these are captured and converted to corresponding digital signals via one or more analog-to-digital converter modules within the control unit 400.

Additionally, the control unit 400 includes inputs for monitoring power supply current 422, and ambient temperature 424 of the switching apparatus. A set of status outputs 426 may be connected, for example, to front or rear panel indicator LEDs.

A communications port 428, such a serial communications port, is provided such that an external device, such as the monitoring apparatus of the type disclosed in U.S. Pat. No. 8,983,415, is able to issue commands from the control unit, and to receive alarms, and other information, back from the control unit.

As will be appreciated from the above discussion, the control unit 400 and in particular the CPU 402, is responsible for overall management and operation of the switching apparatus 100. This includes, for example, the settings of the variable attenuators 128, 136 in order to achieve unity gain between input ports 102, 106 and corresponding output ports 132, 140. The precise attenuation control signals required in order to achieve this transparent pass-through operation will generally vary with each unit (due to component variations and manufacturing tolerances), and also typically vary as a function of frequency, and possibly also temperature. Each individual switching unit is therefore calibrated following manufacture, in order to determine the correct default settings, in particular for the control signals 412, 416, required to set the variable attenuators into their default states. In an exemplary embodiment, the calibration is performed for four distinct frequency bands that are commonly employed within wireless communications systems, namely 132 to 174 MHz (band 'a'), 380 to 520 MHz (band 'b'), 746 to 870 MHz (band 'c') and 870 to 960 MHz (band 'd'). The resulting calibration data 430 is stored within a portion of non-volatile memory of the control unit 400.

Figure 5:
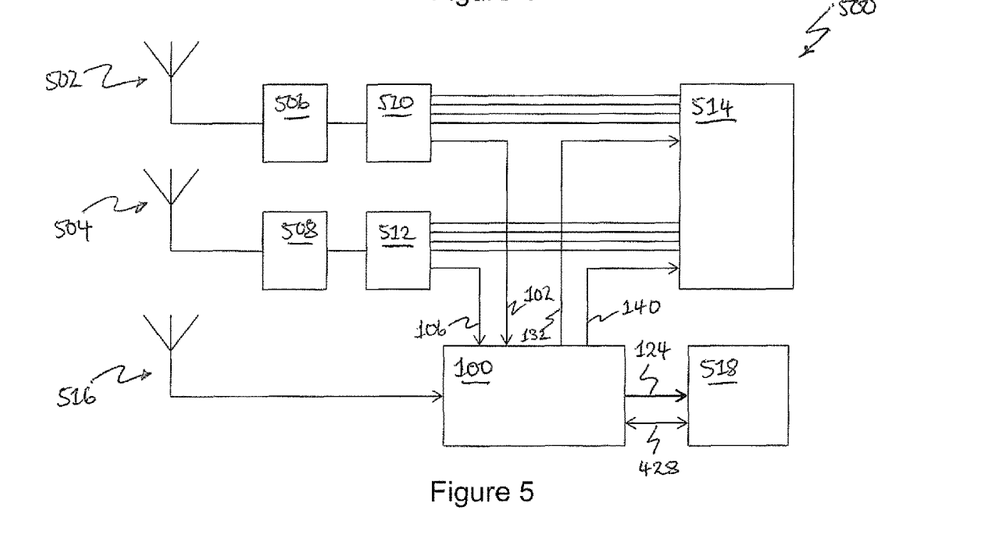
FIG. 5 is a schematic diagram illustrating an application of the RF signal switching apparatus according to an embodiment of the invention.

FIG. 5 is a schematic diagram 500 illustrating an application of the RF signal switching apparatus 100 embodying the present invention. As will be appreciated, various other applications and configurations are possible, and the particular arrangement 500 shown in FIG. 5 is provided by way of example only. An existing, conventional, wireless site comprises a plurality of antennas, e.g. 502, 504. The antennas are connected to corresponding tower-top amplifiers 506, 508. Outputs of the amplifiers are, in turn, connected to receiver multi-couplers 510, 512. Conventionally, the outputs of the receiver multi-couplers 510, 512 are directly connected to a rack of corresponding receivers 514.

In accordance with one exemplary deployment, an RF signal switching apparatus 100 embodying the invention is connected between outputs of the receiver multi-couplers 510, 512 and corresponding inputs of receiver units within the rack 514. Due to the transparent pass-through functionality of the switching apparatus 100, the receiver multi-couplers and corresponding receivers continue to operate as normal, unaffected by the presence of the switching apparatus 100. A local antenna 516 is also connected to the third input port 142 of the switching apparatus 100.

A monitoring apparatus 518, such at the apparatus disclosed in U.S. Pat. No. 8,983,415, is connected to the switching apparatus 100 via the RF signal monitoring output 124 and the communications interface 428. The monitoring apparatus 518 is able to send commands via the communications interface 428 in order to configure the switch arrangement 114, the monitoring signal output power (via attenuator 172), and other operating parameters of the switching apparatus 100, such as alarm levels. The monitoring apparatus 518 is also able to receive communications from the switching apparatus 100, such as alarm signals, status information, and so forth.

In order to facilitate communications between the switching apparatus 100 and external devices, including (but not limited to) monitoring apparatus 518, the program instructions 408 are configured such that when executed by the CPU a command interface is implemented over the communications channel 428. A brief overview of an exemplary command set will now be provided.

Command 'DEFAULT': returns configuration settings to the factory defaults. Following execution of the DEFAULT command, RF signal outputs 132, 140 are enabled, RF alarm level settings reset to −35 dBm, RF warning level settings reset to −45 dBm, alarm delay setting reset to 1 second, gain from inputs 102, 142, 106 to monitoring output 124 all reset to 0 dB.

Command 'CAL ANT {a|b|c|d}{<0 ... −30>}': calibrate the gain from input 142 to monitoring output 124 for the specified frequency band 'a'-'d'. Used during initial calibration. For example, an external test rig applies a signal within the desired band to the input 142, and measures the RF output 124. From this measurement, the required setting of the attenuator 172 for 0 dB gain (or any other standard value) may be determined. This value is then set using the CAL ANT command, whereby the CPU stores the value in the calibration data store 430.

Command 'CAL RF {1|2}{a|b|c|d}{<0 ... 16>}|{<0 ... 30>}': calibrate the settings for attenuator 128 (channel 1) or 136 (channel 2) for the specified frequency band 'a'-'d'. Used during initial calibration. For example, an external test rig applies a signal within the desired band to one of the inputs 102, 106, and measures the corresponding RF output 132,140. From this measurement, the required settings of the respective precision variable attenuator 128, 136 for 0 dB gain may be determined. The first value is a software-based setting for the PIN diode attenuators 308, while the second corresponds with the 0.5-dB setting steps of the digital attenuators 310. These values are then set using the CAL RF command, whereby the CPU stores the values in the calibration data store 430.

Command 'CAL RX {1|2}{a|b|c|d|}{<0 ... 30>}': calibrate the gain from input 102 (channel 1) or input 106 (channel 2) to monitoring output 124 for the specified frequency band 'a'-'d'. Used during initial calibration. For example, an external test rig applies a signal within the desired band to one of the inputs 102, 106, and measures the RF output 124. From this measurement, the required setting of the attenuator 172 for 0 dB gain (or any other standard value) may be determined. This value is then set using the CAL RX command, whereby the CPU stores the value in the calibration data store 430.

Command 'SET ALARM' {1|2|a}{<−30 ... −80>}: sets the power level (in dBm) detected at the specified one of the detectors 160 (channel 1), 164 (channel 2), or 162 (channel 'a') that will trigger an alarm signal to the attached monitoring device via the communications interface 428. The specified value is stored by the CPU in memory for ongoing comparison with the detected power levels.

Command: 'SET ALARM DELAY {0 . . . 255}': sets a delay period, in seconds, until an alarm is reported. The specified value is stored by the CPU in memory, and used to initialise a timer when an alarm level is detected at one of the power detectors. The alarm is only generated if the excessive power level persists until expiry of the timer.

Command: 'SET ANT GAIN {<0 . . . 15>}': sets the gain of the antenna input 142. During operation, the total gain, in dB, between the input 142 (when selected) and monitoring output 124 can be set using this command. The processor uses the specified value, and the relevant calibration data 430, to calculate the required setting for the attenuator 172.

Command 'SET BAND {a|b|c|d}': sets the operating band of the switching apparatus. During operation, the current band determines which data in the calibration store 430 is used to calculate attenuator settings. When interfaced with a compatible monitoring apparatus 518, this setting is automatically configured to match the band currently being monitored, i.e. this command is not normally generated manually.

Command: 'SET CURRENT {lo|high}{<0 . . . 1000>}': sets the lower ('lo') or upper ('high') current alarm limits, in mA. As discussed above, in particular embodiments of the invention supply current is monitored by the CPU 402 via input 422. For a given design, a typical range of normal operating supply currents can be determined during testing. Substantial variations from normal may be indicative of a fault (e.g. a failed component resulting in a short or open circuit). Setting lower and upper current limits enables these values to be stored by the CPU 402, and compared periodically against the monitored supply current in order to provide a fault warning.

Command 'SET RX GAIN {1|2}{<0 . . . 15>}': sets the gain of the specified RF input 102 (channel 1} or 106 (channel 2). During operation, the total gain, in dB, between each input 102, 106 (when selected) and monitoring output 124 can be set using this command. The processor uses the specified value, and the relevant calibration data 430, to calculate the required setting for the attenuator 172.

Command: 'SET RF {1|2}{on|off}': enables or disables the RF outputs 132, 140. During operation, this command allows either one of the RF 'pass-through' outputs to be disabled. The CPU 402 implements the 'off' function by setting the corresponding digital step attenuator 310 to its maximum value.

Command: 'SET RX PATH {1|2|a}': selects the input 102 (channel 1), 106 (channel 2) or 142 (channel 'a') to be switched to the monitoring output 124. Upon receipt of this command, the CPU 402 configures the switching arrangement 114 in accordance with the requested input, and the attenuator 172 in accordance with the corresponding current gain setting and frequency band.

Command 'SET WARNING {1|2|a}{<-30 . . . -80>}': sets the power level (in dBm) detected at the specified one of the detectors 160 (channel 1), 164 (channel 2), or 162 (channel 'a') that will trigger a warning. Typically, the warning level will be set below the alarm level. A warning status may be indicated by a panel LED (e.g. via output 426) and/or by a status value that can be retrieved using the SHOW STATUS command. The specified value is stored by the CPU in memory for ongoing comparison with the detected power levels.

Command 'SHOW STATUS': returns a string representing the unit status. This command may be executed automatically as part of ongoing monitoring by a compatible monitoring apparatus 518 and/or in response to a manual/user request via a network/device management interface.

Command 'SHOW TEMP': returns a string representing the internal temperature received by the CPU 402 via input 424.

Command 'TEST ALARM {0|1}': forces activation ('1') or deactivation ('0') of the alarm signal. This command may be used during testing of the unit, and/or in normal operation as part of a power-up, or periodic test, procedure, for example under control of a compatible monitoring apparatus 518.

As will be appreciated from the foregoing description, the configuration of the switching apparatus 100, and in particular the provision of the programmable control unit 400, provides the flexibility and adaptability to implement many variations, including desired new features from time to time. For example, the exemplary command set outlined above may be extended or modified in any manner required, by altering the relevant portion of the program instructions 408. Furthermore, variations in hardware, such as the development of embodiments with additional input ports, output ports and/or switching configurations, are also possible, and are within the scope of the present disclosure. Accordingly, it will be appreciated that the particular exemplary features and functions described herein are not intended to be exhaustive of all possible functionality provided within various embodiments of the invention. It will be understood, rather, that the overall scope is as defined in the claims appended hereto.

The invention claimed is:

1. A switching apparatus comprising:
at least first and second RF signal inputs, each coupled to an RF signal path including a coupler directing a portion of input RF signal power to corresponding first and second RF signal outputs;
an RF signal switching arrangement having a first switching control input, a switch output, a first switch input coupled to the first RF signal path, a second switch input coupled to the second RF signal path, the RF signal switching arrangement being operable by the control input to selectively connect the first or second switch input to the switch output;
an RF signal monitoring output coupled to the switch output; and
a processor having a first switch control output coupled to the control input of the RF signal switching arrangement, and configured to:
receive a switch command input; and
generate a switch control signal at the first switching control output, which is adapted to configure the RF signal switch arrangement in accordance with the switch command input.

2. The switching apparatus of claim 1 which is configured to support a plurality of frequency bands.

3. The switching apparatus of claim 1, further comprising first and second RF power detectors respectively coupled to the first and second RF signal paths and having first and second detected power outputs, wherein the processor has at least one input operatively coupled to the first and second detected power output, and is further configured to monitor power levels at the first and second RF signal inputs.

4. The switching apparatus of claim 3 wherein the processor is further configured to maintain an alarm level setting, and to generate an alarm signal in the event that one or more of the monitored power levels exceeds the alarm level setting.

5. The switching apparatus of claim 4 wherein the processor is further configured to receive an alarm level command input having an alarm level setting parameter, and to update the alarm level setting in accordance with the alarm level setting parameter.

6. The switching apparatus of claim 4 wherein the processor is further configured to maintain an alarm delay setting, and to delay generation of the alarm signal in accordance with the alarm delay setting.

7. The switching apparatus of claim 1 wherein the portion of input RF signal power is directed to the first and second RF signal outputs via first and second variable RF attenuation arrangements, each having at least one attenuation control signal, wherein the processor has at least one attenuation control output operatively coupled to the attenuation control inputs, and is further configured to generate attenuation control signals at the attenuation control output.

8. The switching apparatus of claim 7 wherein the processor is further configured to maintain calibration settings, including attenuation control signal values determined to achieve unity gain between each RF signal input and its corresponding RF signal output.

9. The switching apparatus of claim 8 wherein the calibration settings comprise separate calibration data for each one of a plurality of frequency bands supported by the RF signal switching apparatus.

10. The switching apparatus of claim 1 wherein the RF signal monitoring output is coupled to the switch output via a monitoring variable RF attenuation arrangement having a monitoring attenuation control input, wherein the processor has an attenuation control output operatively coupled to the monitoring attenuation control input, and is further configured to generate attenuation control signals at the attenuation control output.

11. The switching apparatus of claim 10 wherein the processor is further configured to maintain attenuation settings corresponding with the RF signal monitoring output, and to generate monitoring attenuation control output signals in accordance with the attenuation settings.

12. The switching apparatus of claim 11 wherein the processor is configured to receive a gain setting command input having a gain setting parameter, and to update at least one of the monitoring attenuation settings in accordance with the gain setting parameter.

13. The switching apparatus of claim 11 wherein the monitoring attenuation settings comprise calibration data, and generating the monitoring attenuation control signal comprises converting an absolute gain setting value to a control signal value using the calibration data.

14. The switching apparatus of claim 13 wherein the calibration data comprises separate calibration data for each one of the first and second RF signal inputs, and for each one of a plurality of frequency bands supported by the RF signal switching apparatus.

15. The switching apparatus of claim 14 which comprises a third RF power detector coupled to the third RF signal input, and having a third detected power output, wherein the processor has an input operatively coupled to the third detected power output, and is further configured to monitor a power level at the third RF signal input.

16. The switching apparatus of claim 1 which comprises a third RF signal input, wherein the RF switching arrangement comprises a third switch input coupled to the third RF signal input, and is operable to selectively connect any of the first, second or third switch inputs to the switch output.

* * * * *

UNITED STATES PATENT AND TRADEMARK OFFICE
CERTIFICATE OF CORRECTION

PATENT NO. : 9,917,631 B2  
APPLICATION NO. : 15/334133  
DATED : March 13, 2018  
INVENTOR(S) : Anthony David Bartholomaeus et al.

Page 1 of 1

It is certified that error appears in the above-identified patent and that said Letters Patent is hereby corrected as shown below:

On the Title Page

Item (72)  
Please change the inventor name Anthony David Batholomaeus to Anthony David Bartholomaeus.

Signed and Sealed this  
Second Day of July, 2019

Andrei Iancu  
*Director of the United States Patent and Trademark Office*